United States Patent [19]

Maire et al.

[11] 4,205,055

[45] May 27, 1980

[54] DUAL PORE-STRUCTURE ARTIFICIAL CARBON AND GRAPHITE

[75] Inventors: Jacques Maire, Epinay sur Seine; Jacques Fourré, Soisy sous Montmorency; Jean P. Gervais, Noisy le Sec, all of France

[73] Assignee: Le Carbone-Lorraine, Paris, France

[21] Appl. No.: 903,915

[22] Filed: May 8, 1978

[30] Foreign Application Priority Data

May 12, 1977 [FR] France ................... 77 14581

[51] Int. Cl.² ................... C01B 31/02; C01B 31/04
[52] U.S. Cl. ................... 423/445; 252/422; 252/444; 264/29.1; 423/448; 423/449
[58] Field of Search ................... 423/448, 449, 445; 264/29.1, 29.7, 43, 44, 59, 29.5; 252/422, 425, 444; 106/40 R, 40 V, 56

[56] References Cited

U.S. PATENT DOCUMENTS

| | | | |
|---|---|---|---|
| 1,037,901 | 9/1912 | Hansen | 264/29.5 |
| 2,814,076 | 11/1957 | Gartland | 264/29.1 |
| 3,338,993 | 8/1967 | Juel et al. | 264/29.1 |
| 3,419,645 | 12/1968 | Pietzka et al. | 264/29.5 X |
| 3,642,962 | 2/1972 | Wallouch | 423/448 X |

FOREIGN PATENT DOCUMENTS 1510568  5/1978  United Kingdom ................... 423/448

*Primary Examiner*—Edward J. Meros
*Attorney, Agent, or Firm*—Brisebois & Kruger

[57] ABSTRACT

Dual pore-structured carbon and graphite consist essentially of a macroporous agglomeration of strongly bonded microporous grains of carbon or graphite the radii of the macropores therein being from substantially 10 to 350 μm and those of the micropores from substantially 0.2 to 1.0 μm, with the macropores being joined by intercommunicating channels which form a fluid permeable structure. Such carbon or graphite has a density of from 0.70 to 1.50 grams/cc., a permeability to gases of from 20 to 500 cm²/sec/atmos and a porosity of from 30 to 50%. Such materials are produced by including in a mixture of tar or pitch and finely divided solid carbonaceous material in suitable proportions, a particulate eliminable non-carbon-forming material having a particle size of 10 to 350 μm, which material is substantially insoluble in said mixture, in a proportion sufficient to secure the desired porosity, shaping and then heating the mixture to effect carbonization and/or graphitization thereof and, after the product has cooled, giving any appropriate after-treatment to eliminate any heat treated residue from said particulate material and leave the desired porous structure.

9 Claims, 4 Drawing Figures

DUAL PORE-STRUCTURE ARTIFICIAL CARBON AND GRAPHITE

This invention relates to a dual pore-structured artificial carbon or graphite and to a method of producing the same.

British Paten Specification No. 26184/76, now Ser. No. 1,510,568 describes and claims an artificial dual textured graphite suitable for use in nuclear reactors having a coarse grained macrostructure in which each of the coarse grains is formed from a number of strongly bonded ultrafine grains of graphite, the maximum size of each of said coarse grains being from 0.4 to 6.0 mm. and each of the dimensions of the individual ultrafine grains being less than 0.050 mm., the ultrafine grains being bonded together by graphitized pore-containing carbon in which the size of the pores present is less than 2 $\mu$ and the coarse grains being bonded together by graphitized pore-containing carbon in which the average size of the pores present is from 5 to 20 $\mu$, said artificial graphite being further characterized by a coefficient of linear expansion within the range of 4 to $6 \times 10^{-6}/°$ C., a thermal conductivity of substantially 0.20 cal/cm/° C./sec., an electrical resistivity within the range of 1500 to 2000 $\mu\Omega$/cm and an anisotropy factor of less than 1.4.

The macropores of this dual textured graphite are very much constricted and consequently the pore spread, as measured by means of a mercury porosimeter, is similar to that of a fine-grained graphite except for the latter's shift towards larger pores; this results in a rather low permeability.

However, for certain applications such as:
(a) a catalyst substrate,
(b) filling materials for use in apparatus in which physical chemical reactions take place between liquid, vapour or liquid/vapour phases, and
(c) electrode materials for use in electrochemistry and materials for filling the space containing the electrolyte in electrochemistry, it is desirable to have available a given micropore structure together with a high-permeability macropore structure which will allow fluids to diffuse readily throughout the material.

The object of the invention is to provide a material suitable for such purposes.

The present invention accordingly provides a dual pore-structure artificial carbon or graphite formed by a macroporous agglomeration of fine, microporous grains, characterised in that the macropore structure is open, and in that the radii of the macropores are between substantially 10 and 350 $\mu$m and those of the micropores between substantially 0.2 and 1 $\mu$m. These macropores are joined by intercommunicating channels.

The other properties of the dual-porosity artifical carbon or graphite of the present invention may vary within relatively wide limits, thus enabling a material to be selected and produced which is best suited to the intended application; the density may vary between 0.70 and 1.50 gms/cc, the permeability to gases may vary from 20 to 500 cm$^2$/sec/atmos., and the porosity may vary between 30% and 50%.

As an illustrative but non-limiting example, the following Table sets out the properties of a dual pore-structure graphite (P), which is compared on the one hand with the properties of a dual-textured graphite (A) according to British Patent Application No. 1,510,568 and on the other hand with the properties of a fine-grain graphite (B), all three of which are obtained from the same starting materials, namely petroleum coke and pitch.

| Property | Dual Pore-Structure Graphite P | Dual-Textured Graphite A | Fine-Grained Graphite B |
|---|---|---|---|
| Apparent density | 1.07 | 1.74 | 1.76 |
| Permeability to gases cm$^2$/sec/atmos. | 350 | 20 | 0.05 |
| Porosity in % | 45 | 15 | 12 |

FIGS. 1, 2, 3 and 4 of the accompanying drawings illustrate other differences between these three artificial graphites.

FIG. 2 shows the micro-texture of the dual pore-structure graphite P of the present invention.

FIG. 3 shows the micro-texture of the dual-textured graphite A of British Patent Application No. 1,510,568.

FIG. 4 shows the micro-texture of the fine-grained graphite B.

Figure 3:
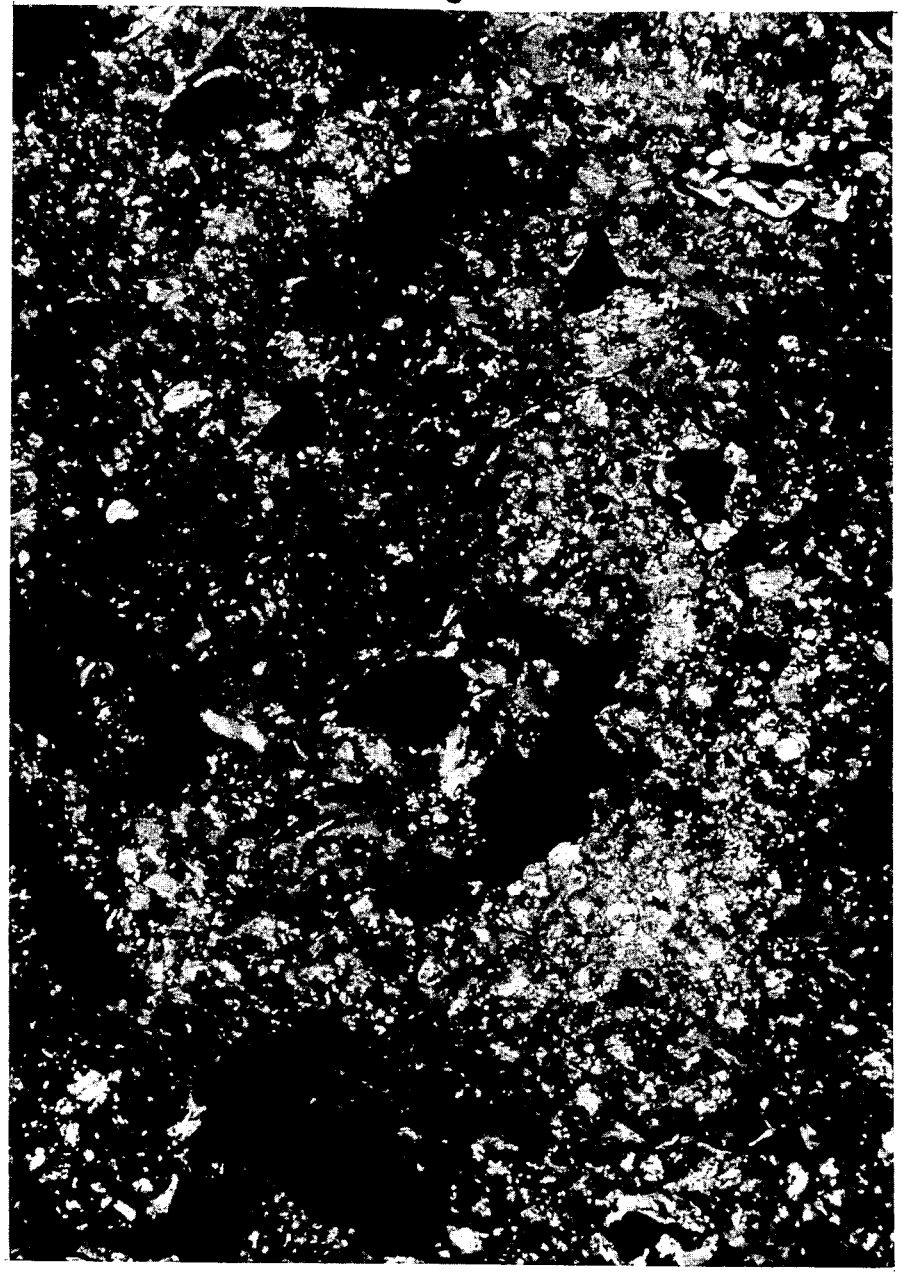
Figure 4:
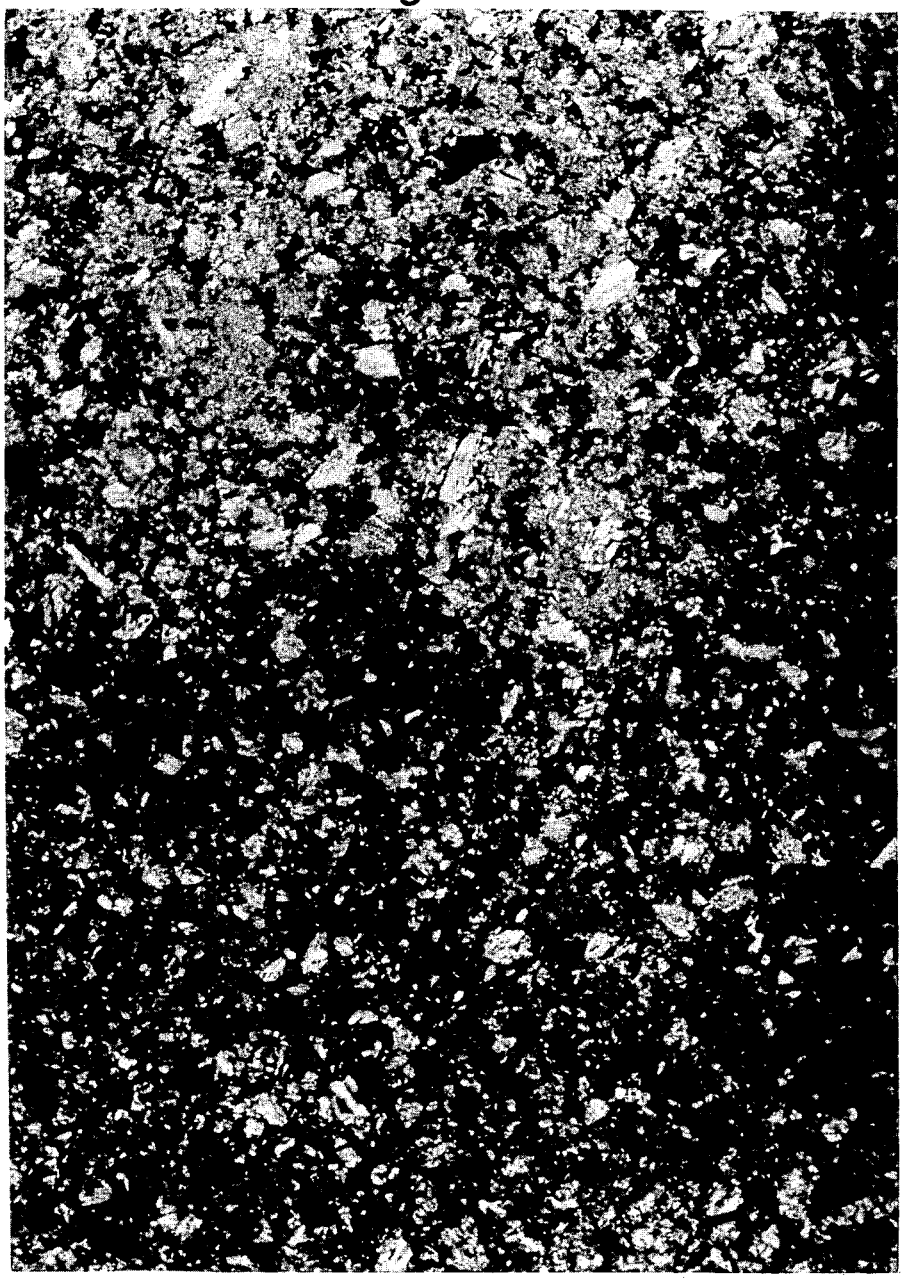

It will be seen from a comparison of the three photomicrographs that the micro-texture of the three graphites is identical as regards the size of the uniformly reflecting areas within the grains but that they differ on the one hand in the size of the pores (the black areas in the figures) and on the other hand by the pressure of absence of intercommunicating channels between the pores. Large pores can be seen between the individual grains present in the structure of graphites P and A (FIGS. 2 and 3), whilst the pores are much smaller in graphite B (FIG. 4). The large pores in graphite P intercommunicate via very short intercommunicating channels (FIG. 2), which will result in small pressure drops in fluids which flow through it when it is in use, whereas in graphite A (FIG. 3) there is no apparent communication between the adjacent pores. In actual fact these pores do communicate via relatively long and narrow channels, which will produce large pressure drops in fluids which flow through this material in use.

Study of the accompanying photomicrographs and a comparison of the properties and pore spread thus clearly demonstrate the differences which exist between the dual pore-structure graphite of this invention and the dual-textured and fine-grained graphites of the prior art.

When a dual pore-structure carbon according to the invention is compared with a dual-textured carbon and a fine-grained carbon, similar observations are made.

The present invention also includes a method of manufacturing dual pore-structure artificial carbon or graphite.

Methods of obtaining artificial carbons and graphites generally comprise the following steps: mixing of carbonaceous starting materials, shaping, carbonisation and, in the case of graphite, graphitisation.

Moreover, French Pat. No. 1,392,000 discloses a method of producing filter elements by injecting liquid material, and in particular liquid metals, into a mass of eliminable powder of predetermined grain size. When the powder has been eliminated, the injected material now solid, has a pore structure containing constrictions the size of which pores depends upon the grain size of the powder and the pressure at injection. This specially textured material is markedly permeable, the constrictions between adjoining pores being small in length.

Modifications of this process are described in the third addition No. 89618 of this French Patent. One of these relates to the case where the material of which the filter is formed is not liquid at ambient temperature but may be in the form of a powder. This powder is then mixed with the eliminable powder and the mixture is moulded. From then on the procedure is as described in the main patent.

The use of this modified process in a method of producing carbon or graphite results in a method of producing artificial dual pore-structure carbon or graphite according to the invention.

Such method comprises admixing a powdered agglomerate comprising 85–65% by weight of fine particles of carbonacous material agglomerated with 15–35% by weight of tar or pitch, with a powder composed of eliminable non-carbon forming material which is substantially insoluble in the agglomerate shaping this mixture by compression or extrusion, carbonising the shaped mixture, in eliminating the eliminable material by suitable treatment and, when the final product is to be graphite, graphitising the material obtained.

The carbonaceous starting material may be petroleum coke, coal coke, pitch coke, anthracite, lamp black, or wood charcoal.

The treatment to remove the eliminable powder depends upon the nature of the powder which is preferably, but not necessarily, a particulate inorganic material which does not liberate carbon under the conditions of carbonising pitch or graphitisation. It may, for example, be a chemical or thermal treatment. In the latter case, it may be a heat treatment to include carbonisation or graphitisation itself which results in the elimination of the powder by volatilisation or thermal dissociation with formation of a gaseous component, such as carbon dioxide.

Chemical treatment may involve solution of the particles of the powder in a solvent, such as water, and/or a strong acid, such as hydrochloric acid. Obviously when an acid is used it should not be one which exerts any deleterious action upon the carbon or graphite structure. The particulate material may be an alkali or alkaline earth metal halide such as sodium, potassium or calcium chloride which may be volatilised or dissolved in water after completion of the heating. Alternatively it may be a material which undergoes chemical rection under the action of heat, such as magnesium or calcium carbonate to produce the corresponding oxide which is then readily soluble in hydrochloric acid solutions. The oxides of metals such as magnesium calcium, zinc and titanium may be used and subsequently removed by acid treatment.

The texture of the carbon or graphite obtained is of the dual nature, viz (a) a micro-porous structure which is derived from the spaces between the fine particles of the aggregate and by the intrinsically porous structure of the original carbonaceous material comprising the particulate carbonaceous material, and (b) a macro-porous structure represented by the volume initially occupied by the eliminable material, which eliminable material can be varied with respect to size, dimensions, and intercommunication by changing the relative percentages of the eliminable powder and the carbonaceous aggregate, the relative particle sizes of these items, and the conditions under which shaping is performed.

If a very small amount of eliminable powder is used a closed macroporous structure will be obtained. If a large amount is used then in the extreme case what will be obtained will be not a block or carbon or graphite but a heap of unconnected carbonaceous grains.

By adjusting the three parameters mentioned, namely: the relative proportions of eliminable powder and carbonaceous aggregate, the relative particle sizes of eliminable powder and carbonaceous material and the shaping conditions, it is possible to obtain products having the characteristics indicated above, namely: a density of between 0.70 and 1.50, a permeability of gases of from 20 to 500 $cm^2$/sec/atmos. and a porosity of from 30 to 50%, which can be selected to suit the desired end use. A few simple experiments will suffice in any particular case.

In the example given in the Table, maximum porosity and permeability were desired together with relatively low density, the mechanical characteristics being of secondary importance in the application considered.

Figure 1:
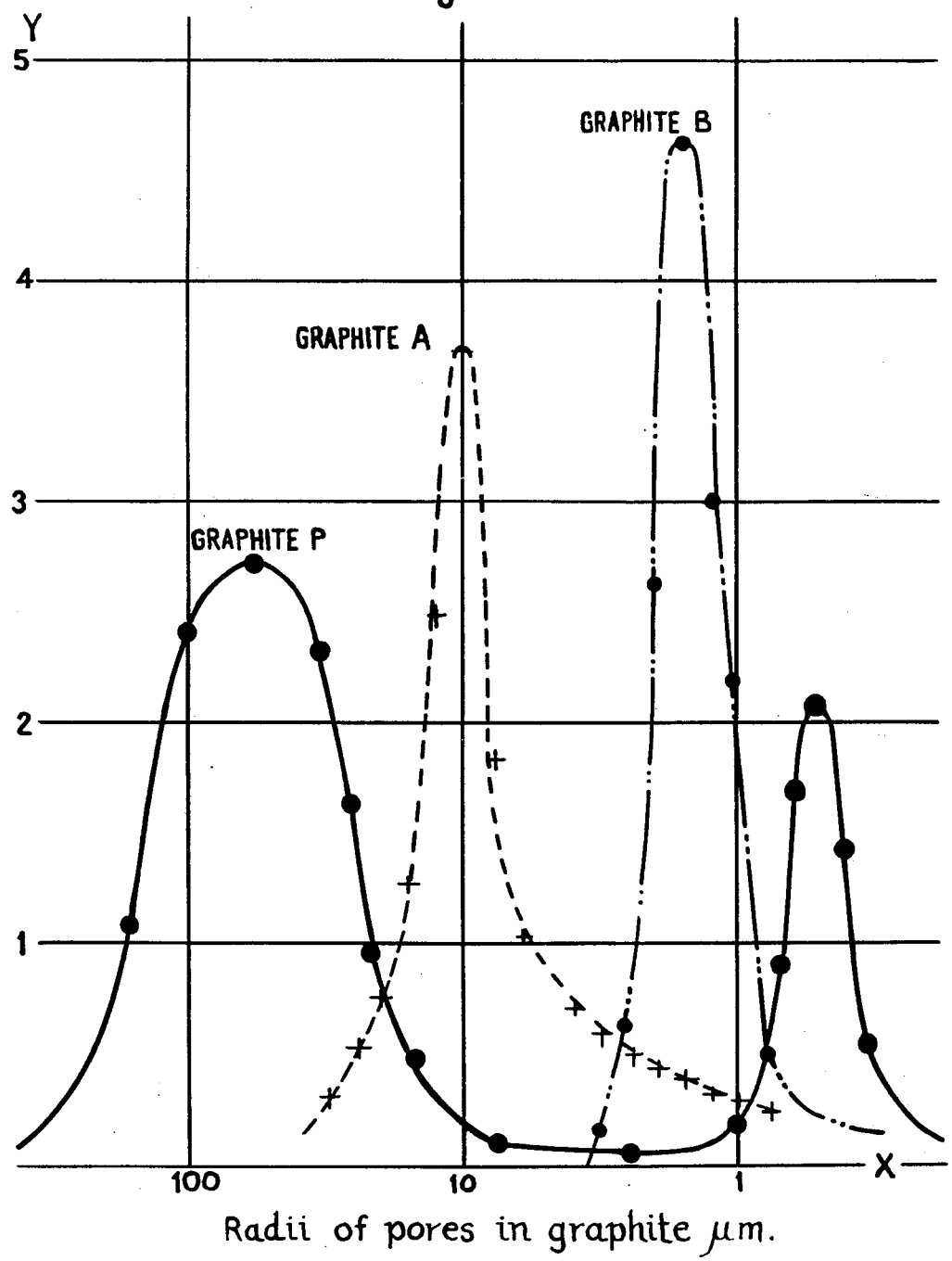
FIG. 1 is a graph showing the distribution of pores in the three graphites as a function of the radius of the pores. Along the x axis are plotted the radii of the pores in um and along the y axis are plotted the percentages of pores of a given radius relative to the volume of graphite.
Figure 2:
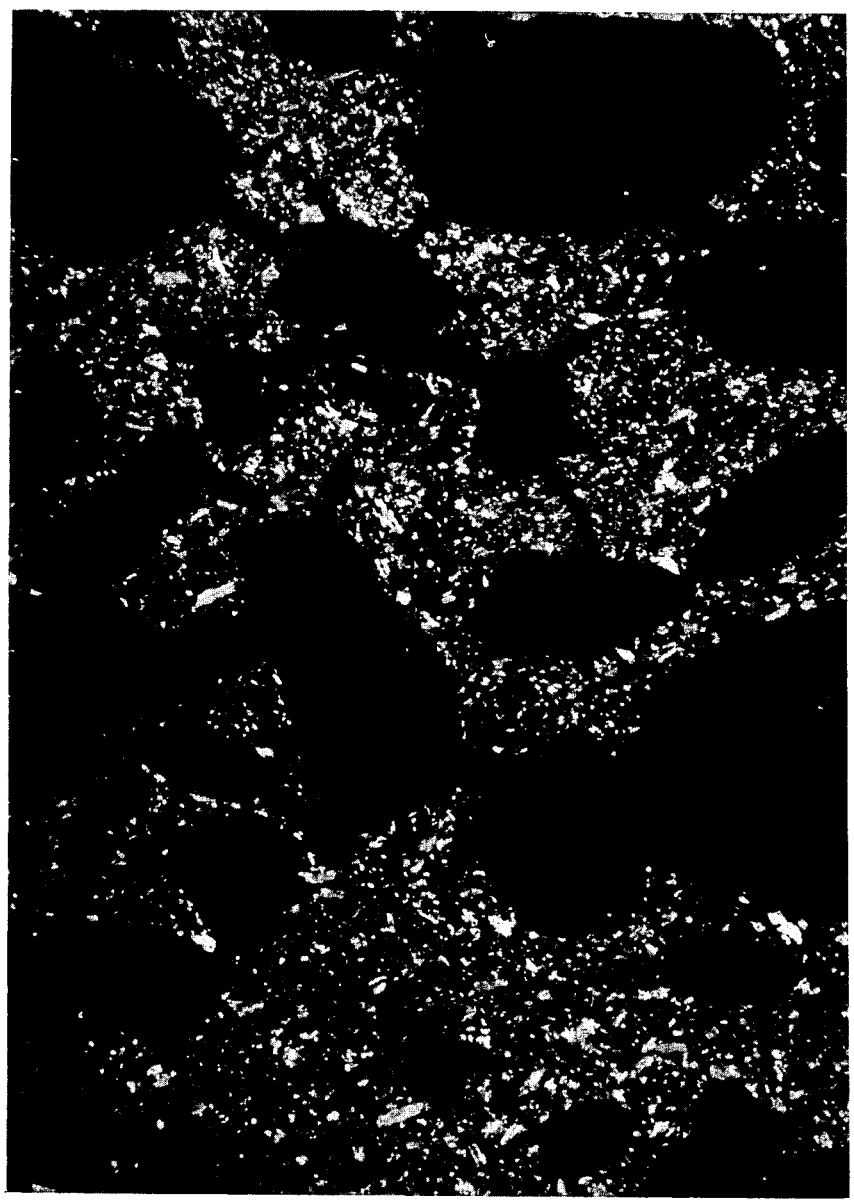
FIGS. 2, 3 and 4 are photomicrographics which show the micro-textures of these three graphites using polarised light at a magnification of 130.

The following Examples, which are given by way of nonlimiting illustration, illustrate a number of variants of this method of production which, in the case of Examples 1 and 2 and the variant of Example 3 enable a dual pore structure graphite having the properties, pore spread and microtexture indicated in the Table and in FIGS. 1 and 2 to be obtained.

EXAMPLE 1

75 Parts by weight of powdered petroleum coke having a particle size of less than 30 μm is agglomerated with 25 parts by weight of pitch in known manner. The raw carbonaceous material obtained is comminuted into an aggregate having a particle size of less than 30 μm.

This aggregate is mixed with powdered sodium chloride having a particle size of from 400 to 600 μm in the proportion of 50% by weight of aggregate to 50% by weight of sodium chloride. The mixture obtained is compressed into blocks at a pressure of 1000 bars under cold conditions.

The blocks are baked at 1100° C. and then graphitised at a temperature above 2600° C. The graphitisation conditions causes the sodium chloride to be vaporised.

The blocks of dual pore-structure graphite according to the invlention may then be reduced to the desired size to suit the intended application. Thus, if it is desired to form a catalyst substrate from them it is merely necessary to break them down into grains approximately 3 to 10 mm. in size.

EXAMPLE 2

This Example constitutes a modification of Example 1.

The aggregate is similarly mixed with powdered sodium chloride having a particle size of from 400 to 600 μm, but in different proportions, namely 60% by weight of aggregate to 40% by weight of sodium chloride.

The mixture obtained is then shaped into cylinders of equal diameter and 8 mm. in length, either by cold compression or by hot extrusion and cutting.

These small cylinders are then baked at 1100° C. and then graphitised at a temperature higher than 2600° C. As in the previous Example, the graphitisation removes the sodium chloride by vaporisation.

The small cylinders of dual pore-structure graphite which are obtained may be used directly as a catalyst substrate.

EXAMPLE 3

The powdered sodium chloride in Example 2 is replaced by powdered calcium carbonate having a particle size of between 100 and 800 μm, and is used in the same proportions.

The mixture obtained is shaped in exactly the same way as that used in Example 2 and the cylinders are baked in the same way at 1100° C.

After the baking, the cylinders are treated with hydrochloric acid in a column and then washed with water to remove the residue of calcium oxide remaining from the calcination of the carbonate, as calcium chloride, and are then dried. Cylinders of carbon are thus obtained.

Depending upon the intended application, it is possible: (a) either to use the cylinders thus obtained, which are then made of dual pore-structure carbon, as they are, as a filling material for example, or (b) to graphitise the cylinders of carbon at a temperature above 2600° C. The cylinders of dual pore-structure graphite which are obtained may, as in the previous Example, be used directly as a catalyst substrate.

EXAMPLE 4

This Example is a modification of the procedure of Example 2.

In forming the aggregate, the petroleum coke is replaced by wood charcoal. After the operations of mixing the aggregate with sodium chloride and shaping, which are identical with those used in Example 2, the small cylinders obtained are subjected to a single heat treatment at 1100° C. and are then washed with hot water to remove the sodium chloride.

The small cylinders which are finally obtained may then be used directly for the intended applications, e.g. as a catalyst substrate, as filling materials and so on.

It should be noted that as a modification in Examples 2, 3 and 4, the shaping of the mixture of aggregate and salt may be carried out in such a way that, instead of cylinders, there are obtained, small spheres of substantially spherical shapes formed by two hemispheres connected by a short interconnecting cylindrical portion.

It should also be noted that for the applications envisaged, it is possible to use either dual pore-structure carbon or the dual pore-structure graphite produced according to the invention, the choice between the two materials being based upon the thermal and electrical characteristics and corrosion resistance which are required in the material.

We claim:

1. An artificial dual pore-structured carbon or graphite which is suitable for use as a catalyst substrate or an electrode material consisting essentially of a macro-porous agglomeration of strongly bonded microporous grains of carbon or graphite, the radius of the macropores being from substantially 10 to 350 μm and that of the micropores being substantially 0.2 to 1.0 μm, said macropores being joined by intercommunicating channels thus forming a fluid permeable structure, said carbon or graphite having a density of from 0.70 to 1.50 gms/cc., a permeability to gases of from 20 to 500 cm$^2$/sec/atmos, and a porosity of from 30 to 50%.

2. A process for the production of an artificial dual pore-structured carbon suitable for use as a catalyst substrate or an electrode material consisting essentially of a macroporous agglomeration of strongly bonded microporous grains of carbon which process comprises preparing an aggregate of (a) 15–35% by weight of tar or pitch and (b) 85–65% by weight of a finely divided carbonaceous material having a particle size up to 100 microns, intimately admixing the resulting aggregate with a particulate, eliminable, non-carbon forming material which material is substantially insoluble in said aggregate, shaping the resulting product is desired shape by compression or extrusion, heating the resulting shaped product to a carbonisation temperature for a time sufficient to carbonize the pitch content thereof, cooling the carbonized shaped material and, when a residue of said particulate material is present in the cooled carbonaceous product, treating said cooled product to remove said residue therefrom, said particulate eliminable material being used in the form of particles which will produce macropores having a radius of 10 to 350 μm in the ultimate product and in such a proportion that the resulting artificial carbon will have a density of from 0.70 to 1.50, a permeability to gases of from 20 to 500 cm$^3$/sec/atmos and a porosity of 30 to 50%.

3. The process of claim 2 in which said finely divided carbonaceous material is selected from the group consisting of petroleum coke, coked coal, coal tar coke, anthracite, lamp black and wood charcoal.

4. The process of claim 2 in which said particulate eliminable material volatilises during heating of said shaped material.

5. The process of claim 2 in which said particulate eliminable material thermally decomposes during heating of said shaped material.

6. A process for the production of an artificial dual pore-structured graphite suitable for use as a catalyst substrate or an electrode material consisting essentially of a macroporous agglomeration of strongly bonded microporous grains of carbon which process comprises preparing an aggregate of (a) 15–35% by weight of tar or pitch and (b) 85–65% by weight of a finely divided carbonaceous material having a particle size up to 100 microns, intimately admixing the resulting aggregate with a particulate, eliminable, non-carbon forming material, which material is substantially insoluble in said aggregate, shaping the resulting product to desired shape by compression or extrusion, heating the resulting shaped product to a carbonising temperature for a time sufficient to carbonize the pitch content thereof, further heating the resulting carbonised product to a temperature of at least 2600° C. for a time sufficient to graphitize the same, and when a residue of said particulate material is present in the cooled graphitized product, treating said graphitized product to remove said residue therefrom, said particulate eliminable material being used in the form of particles which will produce macropores having a radius of 10 to 350 μm in the ultimate graphitized product and in such a proportion that the resulting artificial graphite will have a density of from 0.70 to 1.50, a permeability to gases of from 20 to 500 cm$^3$/sec/atmos and a porosity of 30 to 50%.

7. The process of claim 6 in which said finely divided carbonaceous material is selected from the group consisting of petroleum coke, coked coal, coal tar coke, anthracite, lamp black and charcoal.

8. The process of claim 6 in which said particulate eliminable material volatilises during heating of said shaped material.

9. The process of claim 6 in which said particulate eliminable material thermally decomposes during heating of said shaped material.

* * * * *